United States Patent [19]
Lotze et al.

[11] 3,873,102
[45] Mar. 25, 1975

[54] SANITARY THERMOELEMENT ASSEMBLY

[75] Inventors: Thomas H. Lotze; James Robert Tompkins, both of Greece, N.Y.

[73] Assignee: Sybron Corporation, Rochester, N.Y.

[22] Filed: July 30, 1973

[21] Appl. No.: 383,826

[52] U.S. Cl............... 277/2, 277/26, 136/233, 73/349
[51] Int. Cl............................................. F16j 9/00
[58] Field of Search .......... 277/2, 26, 32; 174/11 R; 136/233, 231, 232; 285/93; 73/349

[56] References Cited
UNITED STATES PATENTS

| | | | |
|---|---|---|---|
| 2,789,844 | 4/1957 | Kessler | 277/169 UX |
| 3,022,670 | 2/1962 | Sutliffe, Jr. | 73/349 X |
| 3,199,348 | 8/1965 | Salera | 136/233 UX |
| 3,207,629 | 9/1965 | Beckman | 136/232 X |

Primary Examiner—Samuel B. Rothberg
Attorney, Agent, or Firm—Theodore B. Roessel; Joseph C. MacKenzie

[57] ABSTRACT

A CIP piping assembly annular gasket having a thermocouple embedded therein with its junction protruding slightly out of the inner periphery of the gasket.

6 Claims, 3 Drawing Figures 3,873,102

SANITARY THERMOELEMENT ASSEMBLY

FIELD OF THE INVENTION

The present invention relates to sensing temperature under sanitary conditions in CIP (clean in place) systems found in food, pharmaceutical, and other industries. Milk pasteurizing apparatus is a typical CIP system. These are designed so that the piping and other parts of the system, having surfaces contacted by the milk, do not accumulate deposits of milk or milk solids, at least not to the extent that the deposits cannot be cleaned away by flushing the system with cleaning materials. As milk temperature is rather carefully controlled, it is necessary to expose thermoelements, i.e., temperature sensing elements, to the milk, so these too must be readily cleaned. These thermoelements provide output signals representative of their temperature, so it is necessary that they be exposed to the milk in such a way that the signals can also be taken to represent the milk temperature properly.

DESCRIPTION OF THE PRIOR ART

The structure of a CIP system has to be modified in one way or another to accomodate a thermoelement. One common expedient involves modifying a piece of piping rather drastically, for example, as by constructing it as a fitting for supporting a thermoelement, or for receiving a thermowell for housing a thermoelement. Many such provisions usually must be disassembled for cleaning, so are not CIP, or, due to dead space, are CIP only with some difficulty.

SUMMARY OF THE PRESENT INVENTION

According to our invention, we in effect modify a gasket in the system. The gasket in question is of the type normally designed to be contacted by the milk, so by providing a thermo element in it at a place where the milk normally contacts the gasket, we obviate the need for modifying the piping itself. In this way, we achieve one prime object of our invention, namely, to provide for sensing the temperature in a CIP system with practically no modification of the structure of the system. It is further a prime object of our invention to provide a CIP temperature sensing arrangement in a CIP system. Finally, is a particular object of our invention to provide a sanitary thermoelement assembly wherein a gasket, sealing a joint in a CIP system, also mounts a thermoelement virtually in direct contact with the liquid in the system.

BRIEF DESCRIPTION OF THE DRAWING

FIG. 1 is an elevation, in section, of piping in a CIP system having our novel thermoelement assembly mounted therein, wherein the thermoelement is in the form of a thermocouple, or the like;

DESCRIPTION OF THE PREFERRED EMBODIMENT

Figure 1:
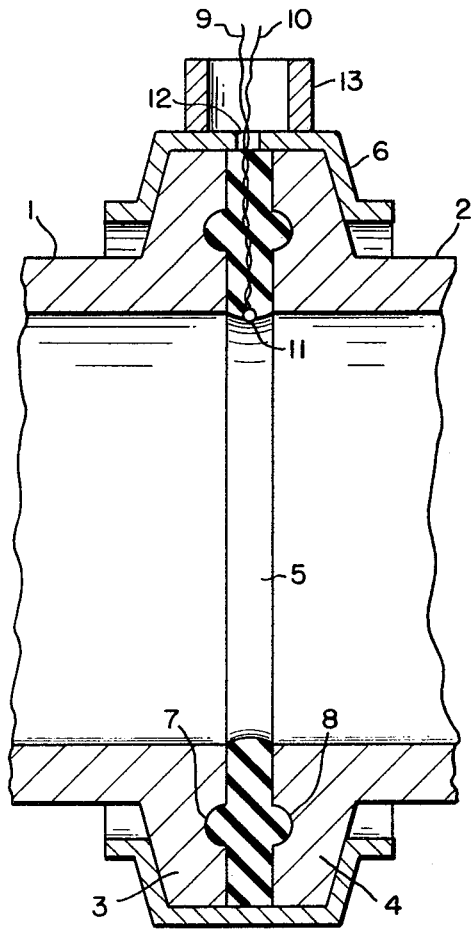

In FIG. 1, piping 1 and 2 have ends terminating in annular flanges 3 and 4 for butting together with a sealing gasket 5 therebetween. The flanges 3 and 4 are drawn together by a split ring clamp 6 of the usual sort sufficiently tightly to cause the inner periphery of the gasket to bulge into the bore of the piping very slightly. The gasket, as shown, may have a pair of annular beads 7 and 8, fitting in complementary-shaped grooves in flanges 3 and 4. This is a common type of CIP pipe joint well known for its property of fluid tightly sealing the joint, yet presenting minimum interference with flow of milk through the piping, and being easily cleaned because the compression of the gasket between the flange faces of the piping ends assures the absence of gaps between gasket and flanges, such as milk could invade, and be retained in.

According to the invention, a thermoelement 11, having leads 9 and 10 for connecting its signal to external means such as an indicator, controller, or the like, is embedded in the gasket 5, just slightly projecting out of the gasket's inner periphery. The leads 9 and 10 pass out of a hole 12 in the clamp, through a fitting 13 fixed to the clamp in any suitable manner.

Figure 2:
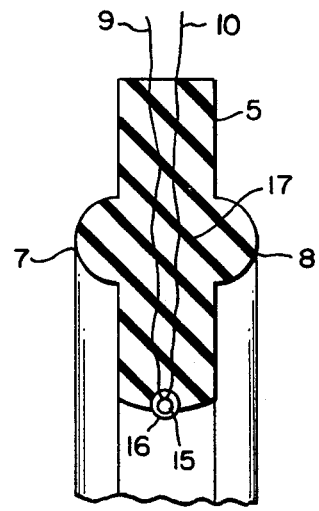
FIG. 2 being an enlarged fragment of such section.
Figure 3:
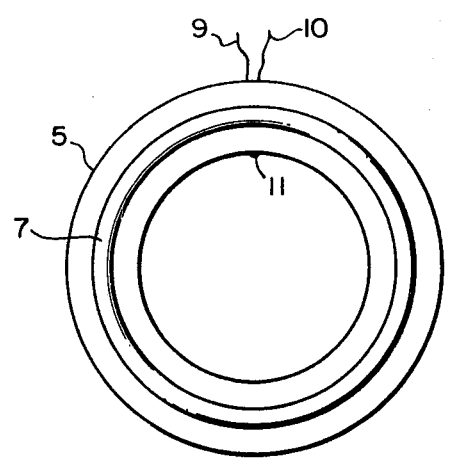
FIG. 3 is a plan view, reduced in size, of the FIG. 1 assembly in its entirety.

In FIG. 2, the thermoelement 11 may be supposed to be a thermocouple consisting essentially of the usual bead-like junction 15 between the wires 9 and 10 which, of course, are of dissimilar metals, which, when so joined, exhibit the well-known thermoelectric effects. Preferably, the junction 15 has a smooth fluid-impervious convering 16 of glass, Teflon, or like insulating substance, the covering giving the thermocouple a more or less spheroidal form fluid-tightly embedded in the gasket. Preferably, the thermocouple is molded in place during manufacture of the gasket, because in this way, as FIG. 3 indicates, the gasket material (rubber or like elastomer) will provide electrical insulation for the leads 9 and 10, and will bond to the bare surfaces of the leads to assure fluid tightness. A slight amount of slack may be provided in the leads to accomodate stretching due to compression of the gasket when it is clamped in place.

For coating the junction 15, we prefer glass because the gasket material will bond thereto, and the thinness of the coating can be such that it does not significantly interfere with transfer of heat between the junction and the fluid flowing past the junction. By a "glass coating," we mean a liquid-impervious, hard, glassy, chemically-resistant layer produced by coating the junction with a particulate mixture of glass ingredients, which is then fused in place, wetting the surface of the junction. Upon cooling, the aforesaid layer results.

While we show a particular form of gasket, other forms could be used, for instance, one without the annular beads. The necessary essence of the gasket is that it has a surface exposed to the flowing fluid.

It is also evident that the thermoelement 11 could take the form of a thermistor, or other element sensitive to temperature, and suitable for molding in a gasket after the fashion of thermocouple 11 and its leads.

Finally, our novel thermoelement assembly could be used in sensing the temperature of fluids other then milk.

Having described our invention in accordance with 35 USC 112, we claim:

1. A sanitary thermoelement assembly comprising, in combination, an annular gasket of elastomeric material for sealing a joint between a pair of pipe-ends, and a thermoelement for providing a signal as a function of the temperature thereof;

said thermoelement being fixed to the inner peripheral surface of said gasket, said surface having CIP form, and said thermoelement providing in said surface a CIP interruption projecting from said surface radially-inwardly of said gasket;

said thermoelement having connecting means sealed within the body of said gasket but emerging therefrom at its outer periphery for connecting said signal to external means.

2. The sanitary thermoelement assembly of claim 1, wherein said thermoelement is encapsulated in a liquid-impervious material, such encapsulation extending fluid-tightly into the said body of said gasket.

3. The sanitary thermoelement assembly of claim 2, wherein said liquid-impervious material is glass.

4. The sanitary thermoelement assembly of claim 2, wherein said liquid-impervious material is Teflon.

5. The sanitary thermoelement assembly of claim 1, wherein said thermoelement is electrical, said elastomeric material is an electrical insulator, said connecting means is a pair of leads spaced, one from the other, within the body of said gasket so that said elastomeric material electrically insulates said leads, one from the other.

6. The sanitary thermoelement assembly of claim 5, wherein said thermoelement is encapsulated in a liquid-impervious electrically-insulating material, such encapsulation extending into the body of said gasket.

* * * * *